US012729309B2

(12) United States Patent
Wu et al.

(10) Patent No.: US 12,729,309 B2
(45) Date of Patent: Sep. 8, 2026

(54) AQUEOUS COATING COMPOSITION AND METHOD OF PREPARING THEREOF

(71) Applicant: Dow Global Technologies LLC, Midland, MI (US)

(72) Inventors: Yan Wu, Shanghai (CN); Hu Li, Shanghai (CN); Baoqing Zheng, Shanghai (CN); Jia Tang, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 355 days.

(21) Appl. No.: 18/576,544

(22) PCT Filed: Sep. 22, 2021

(86) PCT No.: PCT/CN2021/119689

§ 371 (c)(1),
(2) Date: Jan. 4, 2024

(87) PCT Pub. No.: WO2023/044615

PCT Pub. Date: Mar. 30, 2023

(65) Prior Publication Data

US 2024/0309222 A1 Sep. 19, 2024

(51) Int. Cl.

| | |
|---|---|
| ***C09D 5/08*** | (2006.01) |
| ***C09D 5/02*** | (2006.01) |
| ***C09D 7/61*** | (2018.01) |
| ***C09D 7/63*** | (2018.01) |
| ***C09D 125/14*** | (2006.01) |
| *C08K 3/04* | (2006.01) |
| *C08K 3/32* | (2006.01) |
| *C08K 5/092* | (2006.01) |

(52) U.S. Cl.

CPC ............. *C09D 5/084* (2013.01); *C09D 5/022* (2013.01); *C09D 5/028* (2013.01); *C09D 7/61* (2018.01); *C09D 7/63* (2018.01); *C09D 125/14* (2013.01); *C08K 3/04* (2013.01); *C08K 2003/327* (2013.01); *C08K 2003/328* (2013.01); *C08K 5/092* (2013.01); *C08K 2201/014* (2013.01)

(58) Field of Classification Search

CPC ........ C09D 5/084; C09D 5/022; C09D 5/028; C09D 7/61; C09D 7/63; C09D 125/14; C09D 5/024; C09D 5/08; C09D 4/06; C09D 5/082; C09D 17/005; C09D 123/04; C09D 131/00; C09D 133/04; C08K 3/04; C08K 5/092; C08K 2003/327; C08K 2003/328; C08K 2201/014; C08F 2/26; C08F 212/08

See application file for complete search history.

(56) References Cited

U.S. PATENT DOCUMENTS

| | | | | |
|---|---|---|---|---|
| 12,286,550 B2 | 4/2025 | Shu et al. | | |
| 2019/0292399 A1* | 9/2019 | Shu | ........................ | C09D 5/028 |
| 2021/0292455 A1* | 9/2021 | Wu | ........................ | C09D 5/022 |

FOREIGN PATENT DOCUMENTS

| | | |
|---|---|---|
| CN | 105062308 | 11/2015 |
| CN | 103834249 | 6/2016 |
| JP | 58189266 | 11/1983 |
| JP | 04122531 | 7/2008 |
| JP | 2012188481 A | 10/2012 |
| WO | 2020129425 A1 | 6/2020 |

OTHER PUBLICATIONS

Brandrup, "Polymer Handbook", Interscience Publishers.
Fox, Bull. Am. Physics Soc., 1956, vol. 1, No. 3, p. 123.

* cited by examiner

*Primary Examiner* — Cephia D Toomer
(74) *Attorney, Agent, or Firm* — CANTOR COLBURN LLP

(57) ABSTRACT

An aqueous coating composition contains (A) an emulsion polymer comprising, based on the weight of the emulsion polymer, from 5% to 28% by weight of structural units of a cycloalkyl (meth) acrylate, from 0.05% to 10% by weight of structural units of a phosphorous acid monomer, a salt thereof, or mixtures thereof, from zero to 10% by weight of an additional ethylenically unsaturated acid monomer, a salt thereof, or mixture thereof, and structural units of an additional monoethylenically unsaturated nonionic monomer; (B) a specific amount of an aliphatic carboxylic acid of formula (I) HOOC—$R_1$—COOH, (II) $R_2$—COOH or combinations thereof, a salt thereof, or mixtures thereof; and (C) from 2.6% to 10% by weight of an anticorrosive pigment, based on the weight of the aqueous coating composition.

13 Claims, No Drawings

AQUEOUS COATING COMPOSITION AND METHOD OF PREPARING THEREOF

FIELD

The present invention relates to an aqueous coating composition and a method of preparing the same.

INTRODUCTION

Solvent borne coating compositions comprising epoxy resins, polyurethane, or alkyd resins are widely used in metal protective coatings due to their anti-corrosion performance, mechanical properties and appearance. Waterborne coatings have much less environmental concerns than solvent borne coatings and are usually used for light to medium duty metal protection. Black paints, typically comprising carbon black as the main pigment, are widely used for machine and equipment accessories coatings. In the manufacture of black paints via dispersion of carbon black, ball mill or sand mill has been traditionally used. Due to its hydrophobic and low density properties, carbon black is more difficult to wet and disperse well in water by the conventional dispersion treatment alone than inorganic pigments such as titanium dioxide. To facilitate wetting and dispersing of carbon black, large amounts of hydrophilic additives are typically added into black paints, which, however, hurt the anti-corrosion performance of the resultant paints. Thus, it is more challenging to improve corrosion resistance of black paints than paints with other colors to pass 240-hour salt spray resistance testing.

Therefore, there remains a need to provide an aqueous coating composition with the above-described anti-corrosion properties.

SUMMARY

The present invention provides an aqueous coating composition comprising a novel combination of an emulsion polymer and a specific amount of an aliphatic carboxylic acid and anticorrosive pigments. The aqueous coating composition including black paints demonstrate excellent corrosion resistance characterized by a maximum creep at scribe of 2 millimeters (mm) after 240 hours of exposure to salt spray in accordance with ASTM B117 (2011).

In a first aspect, the present invention is an aqueous coating composition comprising:

(A) an emulsion polymer comprising, based on the weight of the emulsion polymer, from 5% to 28% by weight of structural units of a cycloalkyl (meth)acrylate, from 0.05% to 10% by weight of structural units of a phosphorous acid monomer, a salt thereof, or mixtures thereof, from zero to 10% by weight of an additional ethylenically unsaturated acid monomer, a salt thereof, or mixture thereof, and structural units of an additional monoethylenically unsaturated nonionic monomer;

(B) an aliphatic carboxylic acid, a salt thereof, or mixtures thereof; wherein the aliphatic carboxylic acid has the structure selected from of formula (I), (II), or combinations thereof:

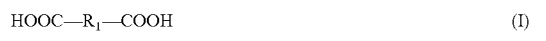

$HOOC—R_1—COOH$ (I)

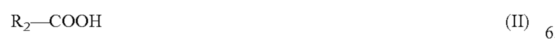

$R_2—COOH$ (II)

where $R_1$ is an alkylene group containing 2 to 16 carbon atoms or a cycloalkylene group containing more than 8 carbon atoms to 16 carbon atoms, and $R_2$ is an alkylene group containing 3 to 17 carbon atoms or a cycloalkylene group containing more than 8 carbon atoms to 17 carbon atoms;

wherein the aliphatic carboxylic acid, the salt thereof, or mixtures thereof are present in an amount to provide $—OOC—R_1—COO—$ and/or $R_2—COO—$ segments at a concentration of greater than 0.29% to less than 0.7% by weight, based on the weight of the aqueous coating composition; and (C) from 2.6% to 10% by weight of an anticorrosive pigment, based on the weight of the aqueous coating composition.

In a second aspect, the present invention is a method of preparing the aqueous coating composition of the first aspect. The method comprises admixing the emulsion polymer; the aliphatic carboxylic acid, the salt thereof, or mixtures thereof; and the anticorrosive pigment.

DETAILED DESCRIPTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International methods.

Products identified by their tradename refer to the compositions available under those tradenames on the priority date of this document.

"And/or" means "and, or as an alternative". All ranges include endpoints unless otherwise indicated.

"Aqueous" composition or dispersion means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, or mixtures thereof.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

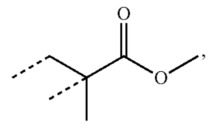

where the dotted lines represent the points of attachment of the structural unit to the polymer backbone.

Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" as used herein can be measured by various techniques including, for example, differential scanning calorimetry ("DSC") or calculation by using a Fox equation. The particular values of Tg reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

The aqueous coating composition of the present invention comprises one or more emulsion polymer. The emulsion polymer useful in the present invention comprises structural units of one or more cycloalkyl (meth)acrylate. Examples of suitable cycloalkyl (meth)acrylates include cyclohexyl (meth)acrylate, methcyclohexyl (meth)acrylate, isobornyl (meth)acrylate, dihydrodicyclopentadienyl (meth)acrylate, trimethylcyclohexyl (meth)acrylate, t-butyl (meth)cyclohexyl acrylate, or mixtures thereof. Preferred cycloalkyl (meth)acrylates include cyclohexyl methacrylate, cyclohexyl acrylate, methcyclohexyl acrylate, or mixtures thereof. The emulsion polymer may comprise structural units of the cycloalkyl (meth)acrylate at a concentration of 5% or more, and can be 6% or more, 7% or more, 8% or more, 9% or more, 10% or more, 11% or more, 12% or more, 13% or more, 14% or more, or even 15% or more, while at the same time is generally 28% or less, and can be 27% or less, 26% or less, 25% or less, 24% or less, 23% or less, 22% or less, 21% or less, or even 20% or less, by weight based on the weight of the emulsion polymer. "Weight of the emulsion polymer" herein refers to the dry weight of the emulsion polymer.

The emulsion polymer useful in the present invention may comprise structural units of one or more phosphorous acid monomer, a salt thereof, or mixtures thereof. Phosphorous acid monomers may have an ethylenically unsaturation. The phosphorous acid monomers can be dihydrogen phosphate esters of an alcohol in which the alcohol contains or is substituted with a polymerizable vinyl or olefinic group. The phosphorous acid monomers and salts thereof may include phosphoalkyl (meth)acrylates such as phosphoethyl (meth) acrylate, phosphopropyl (meth)acrylate, phosphobutyl (meth)acrylate, salts thereof, and mixtures thereof; $CH_2{=}C(R_{p1})—C(O)—O—(R_{p2}O)_q—P(O)(OH)_2$, wherein $R_{p1}{=}H$ or $CH_3$, $R_{p2}$-alkylene, such as an ethylene group, a propylene group, or a combination thereof; and q=1-20, such as SIPOMER PAM-100, SIPOMER PAM-200, SIPOMER PAM-300 and SIPOMER PAM-600 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, or mixtures thereof. Preferred phosphorus acid monomers are selected from phosphoethyl methacrylate (PEM), phosphoethyl acrylate, allyl ether phosphate, or mixtures thereof; more preferably, phosphoethyl methacrylate. The emulsion polymer may comprise structural units of the phosphorous acid monomer, the salt thereof, or mixtures thereof at a concentration of 0.05% or more, and can be 0.1% or more, 0.2% or more, 0.3% or more, 0.5% or more, 0.6% or more, 0.7% or more, 0.8% or more, 0.9% or more, 1.0% or more, 1.1% or more, 1.2% or more, 1.3% or more, 1.4% or more, or even 1.5% or more, while at the same time is generally 10% or less, and can be 7% or less, 5% or less, 4.5% or less, 4% or less, 3.5% or less, 3.2% or less, 3% or less, 2.8% or less, 2.5% or less, 2% or less, or even 1.8% or less, by weight based on the weight of the emulsion polymer.

The emulsion polymer useful in the present invention may comprise structural units of one or more additional monoethylenically unsaturated acid monomer, a salt thereof, or mixtures thereof, that is other than the phosphorous acid monomer or the salt thereof. The additional ethylenically unsaturated acid monomer can be carboxylic acid monomers, sulfonic acid monomers, or mixtures thereof. The carboxylic acid monomers can be α, β-ethylenically unsaturated carboxylic acids, monomers bearing an acid-forming group which yields or is subsequently convertible to, such an acid group (such as anhydride, (meth)acrylic anhydride, or maleic anhydride); and mixtures thereof. Specific examples of α, β-ethylenically unsaturated carboxylic acids include acrylic acid, methacrylic acid, maleic acid, itaconic acid, crotonic acid, fumaric acid, 2-carboxyethyl acrylate, or mixtures thereof. The sulfonic acid monomers may include sodium vinyl sulfonate (SVS), sodium styrene sulfonate (SSS) and acrylamido-methyl-propane sulfonate (AMPS); salts thereof; or mixtures thereof. Preferably, the additional ethylenically unsaturated acid monomer is the α, β-ethylenically unsaturated carboxylic acid, and more preferably, acrylic acid, methacrylic acid, itaconic acid, or mixtures thereof. The emulsion polymer may comprise structural units of the additional acid monomer and salt thereof at a concentration of zero or more, and can be 0.5% or more, 0.8% or more, 1% or more, 1.2% or more, 1.5% or more, 1.8% or more, or even 2% or more, while at the same time is generally 10% or less, and can be 7% or less, 5% or less, 4.5% or less, 4% or less, 3.5% or less, 3% or less, or even 2.5% or less, by weight based on the weight of the emulsion polymer.

The emulsion polymer useful in the present invention may comprise structural units of one or more monoethylenically unsaturated functional monomer having one or more functional groups selected from ureido, amide, amino, silane, hydroxyl, acetoacetoxy, acetoacetamide, or combinations thereof, that is other than the monomers described above. These monoethylenically unsaturated functional monomers may include, for example, amino-functional monomers such as dimethylaminoethyl methacrylate, dimethylaminoethyl acrylate, dimethylaminopropyl methacrylate, or dimethylaminopropyl acrylate; monomers bearing amide-functional groups such as acrylamide and methacrylamide; vinyltrialkoxysilanes such as vinyltrimethoxysilane, vinyltriethoxysilane, vinyltris(2-methoxyethoxy)silane, vinyldimethylethoxysilane vinylmethyldiethoxysilane, or (meth) acryloxyalkyltrialkoxysilanes such as (meth) acryloxyethyltrimethoxysilane and (meth) acryloxypropyltrimethoxysilane; ureido-functional monomers; hydroxyl-functional monomers such as 2-hydroxyethyl acrylate, 2-hydroxyethyl methacry late, 2-hydroxypropyl methacrylate, and 3-hydroxybutyl methacrylate; acetoacetoxy or acetoacetamide functional monomers including acetoacetoxyalkyl (meth)acrylates such as acetoacetoxyethyl methacrylate (AAEM), acetoacetoxyethyl acrylate, acetoacetoxypropyl methacrylate, acetoacetoxybutyl methacrylate, and 2,3-di(acetoacetoxy)propyl methacrylate; allyl acetoacetate; vinyl acetoacetate; acetoacetamidoalkyl (meth)acrylates such as acetoacetamidoethyl methacrylate and acetoacetamidoethyl acrylate; or mixtures thereof. Desirably, the monoethylenically unsaturated functional monomer is a ureido-functional monomer. As used herein, the term "ureido-functional monomer" refers to an ethylenically unsaturated compound comprising a cyclic ureido group (i.e., an imidazolidin-2-one group). The ureido-functional monomer may include cyclic-ureido-group-containing alkyl esters of (meth)acrylic acids. Examples of suitable ureido-functional monomers include N-(2-methacrylamidoethyl)ethylene urea, N-(2-methacryloyloxyethyl) ethylene urea, N-(maleate diethyl) ethylene urea, or mixtures thereof. Preferred ureido-functional monomer is N-(2-methacryloyloxyethyl) ethylene urea. The emulsion polymer may comprise structural units of the monoethylenically unsaturated functional monomer at a concentration of zero or more, and can be 0.1% or more, 0.2% or more, 0.3% or more, 0.4% or more, 0.5% or more, 0.6% or more, or even 0.7% or more, while at the same time is generally 10% or less, and can be 8% or less, 6% or less, 5% or less, 4% or less, 3% or less, 2.5% or less, 2% or less, 1.5% or less, 1.1% or less, 1% or less, 0.9% or less, or even 0.8% or less, by weight based on the weight of the emulsion polymer.

The emulsion polymer useful in the present invention may comprise structural units of one or more additional monoethylenically unsaturated nonionic monomer that is other than the cycloalkyl (meth)acrylate and the monoethylenically unsaturated functional monomer. "Nonionic monomer" herein refers to a monomer that does not bear an ionic charge between pH=1-14. The additional monoethylenically unsaturated nonionic monomers may comprise $C_1$-$C_{24}$-alkyl (meth)acrylates such as $C_4$-$C_{24}$-alkyl (meth)acrylates, styrene, substituted styrene, (meth)acrylonitrile, or mixtures thereof. $C_1$-$C_{24}$-alkyl (meth)acrylates refer to alkyl esters of (meth)acrylic acids containing alkyl with from 1 to 24 carbon atoms. Examples of suitable additional monoethylenically unsaturated nonionic monomers include methyl methacry late, ethyl (meth)acrylate, 2-ethylhexyl (meth) acrylate, butyl (meth)acrylate, tert-butyl (meth)acrylate, lauryl (meth)acrylate, or mixtures thereof. The additional monoethylenically unsaturated nonionic monomer may comprise any one or any combination of more than one type of the additional monoethylenically unsaturated nonionic monomers selected from styrene, substituted styrene, $C_4$-$C_{24}$-alkyl (meth)acrylates, or mixtures thereof. The emulsion polymer may comprise structural units of the additional monoethylenically unsaturated nonionic monomer at a concentration of 42% or more, and can be 45% or more, 50% or more, 55% or more, or even 60% or more, while at the same time is generally 94% or less, and can be 90% or less, 85% or less, 80% or less, 75% or less, 70% or less, or even 65% or less, by weight based on the weight of the emulsion polymer.

The emulsion polymer useful in the present invention may comprise or be free of structural units of one or more multiethylenically unsaturated monomer including di-, tri-, tetra-, or higher multifunctional ethylenically unsaturated monomer, that is other than the above monomers. Examples of suitable multiethylenically unsaturated monomers include butadiene, allyl (meth)acrylates, divinyl benzene, ethylene glycol dimethacrylate, butylene glycol dimethacrylate, or mixtures thereof. The emulsion polymer may comprise, by weight based on the weight of the emulsion polymer, structural units of the multiethylenically unsaturated monomer at a concentration of from zero to 5%, and can be 3% or less, 2% or less, 1% or less, 0.5% or less, 0.1% or less, or even zero.

The emulsion polymer useful in the present invention may comprise, by weight based on the weight of the emulsion polymer, from 10% to 25% of structural units of the cycloalkyl (meth)acrylate; from 1.5% to 4% of structural units of the phosphorous-containing acid monomer, the salt thereof, or mixtures thereof; and structural units of the additional monoethylenically unsaturated nonionic monomer; and optionally, from zero to 3% of structural units of the monoethylenically unsaturated functional monomer.

Total weight concentration of structural units in the emulsion polymer, based on the weight of the emulsion polymer, is equal to 100%. Types and levels of the monomers above for preparing the emulsion polymer may be chosen to provide the emulsion polymer with a glass transition temperature (Tg) suitable for various applications. The Tg of the emulsion polymer may be zero degree Celsius (° C.) or higher, and can be 5° C. or higher, 10° C. or higher, 15° C. or higher, 20° C. or higher, 25° C. or higher, or even 30° C. or higher, while at the same time is generally 60° C. or less, and can be 55° C. or less, 50° C. or less, 47° C. or less, 44° C. or less, or even 40° C. or less, as calculated by the Fox equation.

The emulsion polymer useful in the present invention may have a number average molecular weight (Mn) of 10,000 grams per mole (g/mol) or more, and can be 15,000 g/mol or more, 20,000 g/mol or more, 25,000 g/mol or more, 30,000 g/mol or more, 35,000 g/mol or more, 40,000 g/mol or more, 45,000 g/mol or more, 50,000 g/mol or more, or even 55,000 g/mol or more, while at the same time is generally 1000,000 g/mol or less, and can be 800,000 g/mol or less, 600,000 g/mol or less, 400,000 g/mol or less, 300,000 g/mol or less, 200,000 g/mol or less, 150,000 g/mol or less, 120,000 g/mol or less, 100,000 g/mol or less, 80,000 g/mol or less, 70,000 g/mol or less, 65,000 g/mol or less, 60,000 g/mol or less, 55,000 g/mol or less, or even 50,000 g/mol or less. Molecular weight of the emulsion polymer may be measured by Gel Permeation Chromatography (GPC) (further details provided under GPC Analysis).

The emulsion polymer useful in the present invention may be prepared by emulsion polymerization of a mixture of the monomers described above ("monomer mixture"). Total concentration of the monomers for preparing the emulsion polymer is equal to 100%, by weight based on the total weight of monomers. For each monomer, the weight concentrations of a monomer in the monomer mixture relative to the weight of the monomer mixture (i.e., the total weight of monomers) can be the same as the above described weight concentrations of structural units of such monomer in the emulsion polymer relative to the emulsion polymer weight. The monomer mixture may be added neat or as an emulsion in water; or added in one or more additions or continuously, linearly or nonlinearly, over the reaction period of preparing the emulsion polymer. The monomer mixture may be added neat or as an emulsion in water; or added in one or more additions or continuously, linearly or nonlinearly, over the reaction period of preparing the polymer. Temperature suitable for emulsion polymerization process may be lower than 100° C., in a range of from 10 to 99° C. or in a range of from 50 to 90° C. One or more surfactants, and preferably, a polymerizable surfactant, may be used in preparing the emulsion polymer. The polymerizable surfactant may have the structure of formula (A),

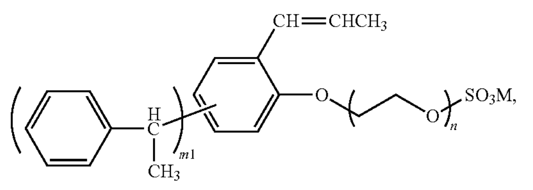

where m1 is an integer from 0 to 4, can be 0, 1, 2, 3 or 4, and preferably from 1 to 3; n is an integer in a range of from 0 to 1,000, from 1 to 100, from 2 to 60, from 3 to 50, or from 4 to 40; and M represents hydrogen, an alkali metal atom, an alkaline earth metal atom, an ammonium residue, or an alkanolamine residue, and preferably, M is $Li^+$, $Na^+$, $K^+$, or $NH_4^+$. The emulsion polymer may comprise structural units of the polymerizable surfactant typically at a concentration of zero or more, and can be 0.5% or more, 0.7% or more, 0.9% or more, 1.1% or more, or even 1.2% or more, while at the same time is generally 10% or less, and can be 7% or less, 5% or less, 4% or less, 3% or less, 2% or less, 1.5% or less, or even 1.3% or less, by weight based on the weight of the emulsion polymer.

One or more radical initiator may be used in the polymerization process. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxy late formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the proceeding acids. Metal salts of iron, copper, manganese, silver, platinum, vanadium, nickel, chromium, palladium, or cobalt may be used to catalyze the redox reaction. Chelating agents for the metals may optionally be used.

One or more chain transfer agent may be used in the polymerization process to control the molecular weight of the emulsion polymer. Examples of suitable chain transfer agents include 3-mercaptopropionic acid, methyl 3-mercaptopropionate, butyl 3-mercaptopropionate, n-dodecyl mercaptan, n-hexadecanethiol, tert-dodecyl mercaptan, n-octadecanethiol, benzenethiol, azelaic alkyl mercaptan, hydroxy group containing mercaptans such as hydroxyethyl mercaptan, mercaptopropionic acid, and mixtures thereof. The chain transfer agent may be used at a concentration of from zero to 2%, and can be 1.5% or less, 1% or less, 0.5% or less, 0.3% or less, 0.2% or less, or even 0.15% or less, by weight based on the total weight of the monomers (that is, the monomer mixture) used for preparing the emulsion polymer.

After completing the polymerization, the obtained aqueous dispersion may be neutralized by one or more bases as a neutralizer to a certain pH value, for example, at least 5, and can be from 6 to 12, from 7 to 10, or from 8 to 9. The bases may lead to partial or complete neutralization of the ionic or latently ionic groups of the emulsion polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof. The emulsion polymer particles in the aqueous dispersion may have a particle size of 50 nanometers (nm) or more, and can be 80 nm or more, or even 90 nm or more, while at the same time is generally 500 nm or less, and can be 200 nm or less, or even 150 nm or less. The particle size herein refers to Z-average size and may be measured by a Brookhaven BI-90 Plus Particle Size Analyzer.

The emulsion polymer may be present in the aqueous coating composition at a concentration of 10% or more, 20% or more, 30% or more, 40% or more, 45% or more, 50% or more, or even 55% or more while at the same is generally at a concentration of 90% or less, 85% or less, 80% or less, 77% or less, 75% or less, or even 73% or less, by weight based on the weight of the aqueous coating composition.

The aqueous coating composition of the present invention also comprises one or more aliphatic carboxylic acid, a salt thereof (i.e., neutralized aliphatic carboxylic acid), or mixtures thereof. The carboxylic acid can be saturated. The number of carbon atoms of the aliphatic carboxylic acid is desirably not higher than 18 to ensure sufficient solubility of the aliphatic carboxylic acid in water. The aliphatic carboxylic acid may have the structure selected from formula (I), (II), or combinations thereof:

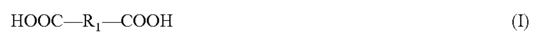

$$HOOC—R_1—COOH \quad (I)$$

where $R_1$ is an alkylene group containing 2 to 16 carbon atoms ($C_2$-$C_{16}$) or a cycloalkylene group containing more than 8 carbon atoms to 16 carbon atoms. $R_1$ may contain 2 carbon atoms or more, and can be 4 carbon atoms or more, 5 carbon atoms or more, 6 carbon atoms or more, or even 7 carbon atoms or more, while at the same time generally has 16 carbon atoms or less, and can be 15 carbon atoms or less, 14 carbon atoms or less, 13 carbon atoms or less, 12 carbon atoms or less, or even 11 carbon atoms or less;

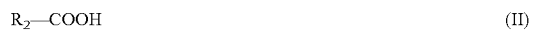

$$R_2—COOH \quad (II)$$

where $R_2$ is an alkylene group containing 3 to 17 carbon atoms ($C_3$-$C_{17}$) or a cycloalkylene group containing more than 8 carbon atoms to 17 carbon atoms. $R_2$ may contain 3 carbon atoms or more, and can be 5 carbon atoms or more, 6 carbon atoms or more, 7 carbon atoms or more, or even 8 carbon atoms or more, while at the same time generally has 17 carbon atoms or less, can have 16 carbon atoms or less, 15 carbon atoms or less, 14 carbon atoms or less, 13 carbon atoms or less, or even 12 carbon atoms or less.

The aqueous coating composition of the present invention may comprise a mixture of two or more dicarboxylic acids of formula (I) and/or salts thereof; a mixture of two or more monocarboxylic acids of formula (II) and/or salts thereof; a mixture of the dicarboxylic acid of formula (I) and the monocarboxylic acid of formula (II), and/or salts thereof; or combinations thereof. Desirably, the aliphatic carboxylic acid is the dicarboxylic acid of formula (I), which can further improve block resistance properties of the coating composition. Suitable aliphatic carboxylic acids may include, for example, sebacic acid ($HOOC(CH_2)_8COOH$), dodecanedioic acid ($HOOC(CH_2)_{10}COOH$), suberic acid ($HOOC(CH_2)_8COOH$), anchoic acid ($HOOC(CH_2)_7COOH$), undecanedioic acid ($HOOC(CH_2)_9COOH$), stearic acid ($HOOC(CH_2)_{16}COOH$), adipic acid ($HOOC(CH_2)_4COOH$), succinic acid ($HOOC(CH_2)_2COOH$), octanoic acid ($H_3C(CH_2)_6COOH$), decanoic acid ($H_3C(CH_2)_8COOH$), nonanoic acid ($H_3C(CH_2)$,COOH), or mixtures thereof. Desirably, the aliphatic carboxylic acid is sebacic acid.

The aliphatic carboxylic acid and/or salts thereof useful in the present invention is typically in the form of an aqueous solution. Such aqueous solution may comprise a reaction mixture of at least one aliphatic carboxylic acid with at least one base. The bases useful for reacting (i.e., neutralizing) with the carboxylic acid may include those described above in the synthesis of the emulsion polymer section, particularly, 2-amino-2-methyl-1-propanol, 2-aminoethanol (MEA), 2-dimethylaminoethanol (DMEA), or mixtures thereof. Depending on the type of the base used, the resulting salt of dicarboxylic acids can be an ammonium salt, an alkali metal salt, an amine salt, or mixtures thereof. The base used herein to neutralize the aliphatic carboxylic acid is in an amount to provide a ratio of the base weight to the total weight of aliphatic carboxylic acid and base in a range of from 0.05 to 0.75, from 0.1 to 0.65, from 0.2 to 0.55, or from 0.3 to 0.5.

The aliphatic carboxylic acid and/or salt thereof may be present in an amount to provide segments selected from —OOC—$R_1$—COO—, $R_2$—COO—, or combinations thereof at a concentration of greater than 0.29% and lower than 0.7%, and can be 0.30% or more, 0.31% or more, 0.32% or more. 0.33% or more, 0.34% or more, 0.35% or more, 0.36% or more, 0.37% or more, 0.38% or more, 0.39% or more, or even 0.40% or more, while at the same time is generally at a concentration of lower than 0.70%, and can be 0.69% or less, 0.68% or less, 0.67% or less, 0.66% or less, 0.65% or less, 0.64% or less, 0.63% or less, 0.62% or less, 0.61% or less, 0.60% or less, 0.59% or less, 0.56% or less, 0.55% or less, 0.52% or less, 0.50% or less, 0.49% or less, 0.48% or less, 0.47% or less, 0.46% or less, 0.45% or less, 0.44% or less, 0.43% or less, 0.42% or less, 0.41% or less, or even 0.40% or less, by weight based on the weight of the aqueous coating composition. In the case when the aqueous coating composition comprises: (i) the aliphatic carboxylic acid of formula (I) and/or salts thereof, and (ii) the aliphatic carboxylic acid of formula (II) and/or salts thereof, the above concentration refers to the total concentration of the —OOC—$R_1$—COO— and $R_2$—COO— segments, by weight based on the weight of the aqueous coating composition. Alternatively, in the case when the aqueous coating composition comprises only one of (i) and (ii), the above concentration refers to the weight concentration of the —OOC—$R_1$—COO— segments or the weight concentration of $R_2$—COO— segments, respectively, relative to the weight of the aqueous coating composition. The —OOC—$R_1$—COO— segments may result from the dicarboxylic acid of formula (I) and/or the salts of the dicarboxylic acid. The $R_2$—COO— segments may result from the monocarboxylic acid of formula (II) and/or the salts of the monocarboxylic acid. The concentration of the —OOC—$R_1$—COO— and/or $R_2$—COO— segments can be determined by liquid chromatography-mass spectrometry (LC-MS), nuclear magnetic resonance (NMR), and/or extraction analyses. Alternatively, the concentration of the —OOC—$R_1$—COO— and/or $R_2$—COO— segments can be calculated by the weight of original added, non-neutralized aliphatic carboxylic acid, relative to the weight of the aqueous coating composition. In the case of the aqueous coating composition comprising the salts of an aliphatic carboxylic acid, the weight of the aliphatic carboxylic acid used for forming such salts, instead of the weight of the salts, is used for calculating the concentration of the —OOC—$R_1$—COO— and/or $R_2$—COO— segments.

The weight ratio of the —OOC—$R_1$—COO— and/or $R_2$—COO— segments to the emulsion polymer can be 0.0114 or more, 0.0116 or more, 0.0118 or more, 0.012 or more, 0.0122 or more, 0.0125 or more, 0.0128 or more, 0.013 or more, 0.0135 or more, 0.0136 or more, 0.0138 or more, 0.014 or more, while at the same time is generally 0.024 or less, and can be 0.0235 or less, 0.023 or less, 0.021 or less, 0.020 or less, 0.0195 or less, 0.019 or less, or even 0.0185% or less.

The aqueous coating composition of the present invention comprises one or more anticorrosive pigment. "Anticorrosive pigment" refers to a pigment that can prevent or retard corrosion of steel through chemical reactions or chelate. Suitable anticorrosive pigments may include, for example, zinc phosphate, zinc molybdate, zinc oxide, aluminum tripolyphosphate, zinc phosphate molybdenum, modified zinc phosphate such as calcium-modified zinc phosphate, calcium-ion-exchanged amorphous silica, or mixtures thereof. Preferably, the anticorrosive pigment is aluminum tripolyphosphate. The anticorrosive pigment may be present at a concentration of from 2.6% to 10%, and can be 2.6% or more, 2.7% or more, 2.8% or more, 2.9% or more, 3.0% or more, 3.2% or more, 3.5% or more, 3.8% or more, 4% or more, 4.2% or more, 4.5% or more, 4.8% or more, 5% or more, 5.2% or more, 5.5% or more, 5.6% or more, 5.8% or more, or even 6% or more, while at the same time is generally 10% or less, and can be 9.5% or less, 9% or less, 8.5% or less, 8% or less, 7.6% or less, 7% or less, 6.5% or less, or even 6% or less, and can be less than 6%, 5.9% or less, 5.8% or less, 5.7% or less, 5.6% or less, 5.5% or less, 5.4% or less, 5.3% or less, 5.2% or less, or even 5.15% or less, by weight based on the weight of the aqueous coating composition. Desirably, the weight ratio of the —OOC—$R_1$—COO— and/or $R_2$—COO— segments to the anticorrosive pigment may be 0.17 or less, 0.16 or less, 0.15 or less, 0.14 or less, 0.13 or less, 0.11 or less, or even 0.10 or less.

The total concentration of the —OOC—$R_1$—COO— segments, the $R_2$—COO— segments, and the anticorrosive pigment can be in a range of from 5% to 25%, and can be 5% or more, 6% or more, 7% or more, 8% or more, or even 9% or more, while at the same is generally 25% or less, and can be 24% or less, 23% or less, 22% or less, 21% or less, 20% or less, 19% or less, or even 18% or less, by weight based on the dry weight of the aqueous coating composition.

The aqueous coating composition of the present invention may comprise or be free of an additional pigment, that is other than the anticorrosive pigment described above. The additional "pigment" herein refers to a material which is capable of materially contributing to the opacity or hiding capability of a coating composition. Such material typically has a refractive index greater than 1.8. Inorganic pigments typically include Examples of suitable additional pigments include metal oxides such as titanium dioxide ($TiO_2$), iron oxide and iron oxide black, carbon black, zinc sulfide, lemon chrome yellow, prussian blue, organic pigment yellow, organic pigment red, or mixtures thereof. Carbon black may include acetylene black, channel black, furnace black, lamp black and thermal black. Preferably, the additional pigment comprises carbon black. The additional pigment, and preferably, carbon black, may be present at a concentration of 0.05% or more, 0.1% or more, 0.3% or more, 0.5% or more, 0.7% or more, 0.8% or more, or even 0.9% or more, while at the same is generally at a concentration of 10% or less, 8% or less, 7% or less, 5% or less, 4% or less, or even 3% or less, by weight based on the weight of the aqueous coating composition.

The aqueous coating composition of the present invention may comprise or be free of one or more extender. "Extender" herein refers to a particulate inorganic material having a refractive index of less than or equal to 1.8 and greater than 1.3. Examples of suitable extenders include barium sulphate, calcium carbonate, clay, calcium sulfate, aluminum silicates, silicates, zeolites, mica, diatomaceous earth, solid or hollow glass, ceramic beads, nepheline syenite, feldspar, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof. The extender may be present at a concentration of zero or more, 0.5% or more, 1% or more, 1.5% or more, 2% or more, 2.5% or more, or even 3% or more, while at the same is generally at a concentration of 15% or less, 13% or less, 12% or less, 11% or less, 10% or less, or even 9% or less, by weight based on the weight of the aqueous coating composition.

The aqueous coating composition of the present invention may comprise or be free of one or more flash rust inhibitor. "Flash rust inhibitor" refers to an additive that can prevent coatings from rapid corrosion right after applying a coating composition on steel substrate. Flash rust inhibitors may include monoacids other than the aliphatic acid of formula (II), alkalis, and/or salts thereof, which can (i) form a protective thin film with inhibition effect through chemical adsorptions(chemisorption) on the surface of the metal, (ii) form a film by oxide protection of the metal, (iii) react with a potential corrosive component present in aqueous media, forming a complex product, or (iv) act as a hydrophobic film through a process of surface adsorption, providing a barrier to the dissolution of the metal in a corrosion reaction. The flash rust inhibitors may include inorganic flash rust inhibitors, organic flash rust inhibitors, or mixtures thereof. Suitable flash rust inhibitors may include, for example, sodium nitrite, sodium molybdate, sodium chromate, sodium phosphates, sodium phosphites, sodium silicate, phosphoric acid, phosphorous acid, and ions of magnesium, zinc, or nickel (typically in the form of soluble salts of magnesium, zinc, or nickel) that can react with the hydroxyl (—OH) group of water, thus forming insoluble hydroxides (such as $Mg(OH)_2$, $Zn(OH)_2$ or $Ni(OH)_2$) deposited on the cathodic site of metal surface; urea, mercaptobenzothiazole (MBT), benzotriazole, aldehydes, heterocyclic nitrogen compounds, sulfur-containing compounds, acetylenic compounds, ascorbic acid, benzoic acid, benzoates, caffeine and extracts of natural substances, or mixtures thereof. The concentration of the flash rust inhibitor may be in a range of from zero to 2%, and can be zero or more, 0.01% or more, 0.03% or more, 0.04% or more, 0.05% or more, 0.06% or more, 0.07% or more, or even 0.10% or more, while at the same is generally at a concentration of 2% or less, 1% or less, 0.5% or less, or even 0.4% or less, by weight based on the dry weight of the aqueous coating composition.

The aqueous coating composition of the present invention may comprise or be free of one or more defoamer. "Defoamer" herein refer to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. Suitable commercially available defoamers may include, for example, TEGO Airex 901 W, TEGO Airex 902 W and TEGO Foamex 1488 polyether siloxane copolymer emulsions available from TEGO, BYK-022 and BYK-024 silicone deformer available from BYK, or mixtures thereof. The defoamer may be present at a concentration of from zero to 5%, from 0.05% to 3%, or from 0.1% to 2%, by weight based on the weight of the aqueous coating composition.

The aqueous coating composition of the present invention may comprise or be free of one or more thickener, also known as "rheology modifier". Thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is HEUR. The thickener may be present at a concentration of from zero to 5%, from 0.05% to 3%, or from 0.1% to 1%, by weight based on the weight of the aqueous coating composition.

The aqueous coating composition of the present invention may comprise or be free of one or more wetting agent. "Wetting agent" herein refer to a chemical additive that reduces the surface tension of a composition, causing the composition to be more easily spread across or penetrate the surface of a substrate. Wetting agents may be polycarboxylates, anionic, zwitterionic, or non-ionic. Suitable commercially available wetting agents may include, for example, SURFYNOL 104 and SURFYNOL TG nonionic wetting agent based on an actacetylenic diol available from Evonik, BYK-190, TEGO-750W and TEGO-755W solutions of block polymer with pigment affinic groups available from BYK and Evonik, respectively, BYK-346 and BYK-349 polyether-modified siloxanes both available from BYK, or mixtures thereof. The wetting agent may be present at a concentration of from zero to 5%, from 0.05% to 3%, or from 0.1% to 2%, by weight based on the weight of the aqueous coating composition.

The aqueous coating composition of the present invention may comprise or be free of one or more coalescent. "Coalescent" herein refer to a slow-evaporating solvent that fuses polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescent may be present at a concentration of from zero to 15%, from 0.5% to 8%, or from 1% to 7%, by weight based on the weight of the aqueous coating composition.

The aqueous coating composition of the present invention may comprise one or more dispersant. Dispersants can be polyacrylic acid or polymethacrylic acid or maleic anhydride with various monomers such as styrene, acrylate or methacrylate esters, diisobutylene, and other hydrophilic or hydrophobic comonomers: salts thereof; or mixtures thereof. The dispersant may be present at a concentration of from zero to 5%, from 0.05% to 3%, or from 0.1% to 1%, by weight based on the weight of the aqueous coating composition.

In addition to the components described above, the coating composition of the present invention may comprise any one or combination of the following additives: buffers, neutralizers, humectants, mildewcides, biocides, anti-skinning agents, colorants, flowing agents, anti-oxidants, plasticizers, leveling agents, adhesion promoters, and grind vehicles. These additives may be present at a total concentration of from zero to 10% or from 0.1% to 2%, by weight based on the weight of the aqueous coating composition. The aqueous coating composition of the present invention further comprises water, for example, at a concentration of from 30% to 90%, from 40% to 80%, from 50% to 70%, or from 55% to 60%, by weight based on the total weight of the aqueous coating composition.

The present invention also relates to a method of preparing the aqueous coating composition of the present invention by admixing the emulsion polymer, typically in an aqueous dispersion, with the aliphatic carboxylic acid and/or salt thereof, the anticorrosive pigment, and optionally, the additional pigment, the extender, and other components described above.

Components in the aqueous coating composition may be mixed in any order to provide the aqueous coating composition. Alternatively, the aliphatic carboxylic acid and/or salt thereof may be first dissolved in water to form an aqueous solution, prior to mixing with other components in the aqueous coating composition. By simple blending all components, the method of the present invention can provide easy processability and application. Any of the above-mentioned optional components may also be added to the aqueous coating composition during or prior to the mixing to form the coating composition. The pigments including the anticorrosive pigments and/or extenders are preferably mixed with the dispersant to form a slurry of pigments and/or extender. The aliphatic carboxylic acid and/or salt solution is preferably added after addition of the emulsion polymer.

The aqueous coating composition of the present invention can be applied to, and adhered to, various substrates. Examples of suitable substrates include wood, metals, plastics, foams, stones, elastomeric substrates, glass, fabrics, concrete, or cementitious substrates. The aqueous coating composition is suitable for various applications such as marine protective coatings, general industrial finishes, metal protective coatings, automotive coatings, traffic paint, Exterior Insulation and Finish Systems (EIFS), wood coatings, coil coatings, plastic coatings, can coatings, architectural coatings, and civil engineering coatings. The aqueous coating composition is particularly suitable for metal protective coatings. The aqueous coating composition can be used as a primer, a topcoat, as one-coat direct-to-metal coating, or in combination with other coatings to form multi-layer coatings.

The aqueous coating composition of the present invention can be applied to a substrate by incumbent means including brushing, dipping, rolling and spraying. Standard spray techniques and equipment for spraying such as air-atomized spray, air spray, airless spray, high volume low pressure spray, and electrostatic spray such as electrostatic bell application, and either manual or automatic methods can be used. After the aqueous coating composition of the present invention has been applied to a substrate, the aqueous coating composition can dry to form a film (this is, coating) at temperatures ranging from 0 to 35° C. or at an elevated temperature, for example, from 35 to 180° C.

The aqueous coating composition of the present invention can provide coatings made therefrom with improved corrosion resistance. The present invention also provides a method of improving corrosion resistance of a corrosion susceptible substrate, such as metal. The method comprises: providing the corrosion susceptible substrate, applying to the aqueous coating composition to the corrosion susceptible substrate (that is, coating onto the corrosion susceptible substrate the coating composition), and drying the aqueous coating composition to form a coated substrate. The corrosion resistance is characterized by a maximum creep at scribe of 2 mm, and preferably, 1.7 mm or less, 1.5 mm or less, 1.2 mm or less, or even 1 mm or less, at a dry film thickness of 40-80 micrometers (um) after at least 240 hours of exposure to salt spray (further details provided under Salt Spray Resistance Test section below). The aqueous coating composition of the present invention may also provide coatings with good block resistance, as indicated by B-1 or better. The present invention also relates to an article made by the method. The present invention also relates to a process for preparing a coating. The process may comprise applying the coating composition to a substrate and drying the applied coating composition to form the coating with the properties defined above.

EXAMPLES

Some embodiments of the invention will now be described in the following Examples, wherein all parts and percentages are by weight (wt %) relative to the aqueous coating composition sample weight unless otherwise specified. Table 1 lists the materials for use in the coating composition samples described herein below. TAMOL and ACRYSOL are trademarks of The Dow Chemical Company.

TABLE 1

| Material | Description | Source | Function |
|---|---|---|---|
| DISPERBYK 190 | Solution of a block copolymer with pigment affinic group | Available from BYK | Dispersant |

TABLE 1-continued

| Material | Description | Source | Function |
|---|---|---|---|
| BYK-022 | Mixture of foam-destroying polysiloxanes and hydrophobic solids in polyglycol | Available from BYK | Defoamer |
| PRINTEX ™ POWDER-4 | Carbon black | Available from The Cary Company | Pigment |
| TAMOL ™ 731A | Hydrophobic copolymer dispersant supplied in the sodium form | Available from The Dow Chemical Company | Dispersant |
| TWIN ™ 4100 | Siloxane-based gemini surfactant | Available from Evonik | Wetting agent |
| TEGO ™ Airex 901W | Polyether siloxane copolymer, containing fumed silica | Available from Evonik | Defoamer |
| BENTONE ™ LT | Organically modified special smectite clay | Available from Elementis | Rheology modifier |
| XinJing ZP-17 (ZP-17) | Aluminum triphosphate | Available from Guangxi Xinjing Keji company (China) | Anticorrosive pigment |
| Stenicphos ZP-01 (ZP-01) | Zinc phosphate | Available from Hangzhou Stenic Color Chemical Engineering Co., Ltd. | Anticorrosive pigment |
| Barium sulfate ($BaSO_4$) | Particle size: 1500 mesh (1.7 micrometers) | Available from Guangfu Jiancai (China) | Filler |
| $NaNO_2$ | | Available from Sinopharm Chemical Reagent Co., Ltd. | Anti-flash rust additive |
| Texanol | 2,2,4-Trimethyl-1,3-pentanediol monoisobutyrate | Available from Eastman | Coalescent |
| ACRYSOL ™ RM-8W thickener | Hydrophobically modified ethylene oxide urethane | Available from The Dow Chemical Company | Rheology modifier |

The following standard analytical equipment and methods are used in the Examples and in determining the properties and characteristics stated herein:

Salt Spray Resistance Test

A coating composition sample was applied onto Q panels (cold rolled steel) by using a 150 μm applicator. The obtained coating film first dried at 23° C. and relative humidity (RH) of 50% for 5 minutes (min), then dried at 60° C. for 30 hours, and finally dried at 23° C. and 50% RH for 7 days. A scribe mark in the shape of an "X" was made by cutting through the dry film on the coated panels using a razor blade. Then these panels were put into a salt spray chamber by exposure of the as prepared coated panels to a salt spray environment (5% sodium chloride fog) in accordance with ASTM B117 (2011). After certain hours of salt spray, the panels were taken out from the salt spray chamber and washed using deionized (DI) water. Then the blister and rust creep along the scribed mark were measured. Creep is the width of the largest blister or rust starting from either side of the scribed mark. The criteria for passing the test is a maximum creep of 2 mm after 240 hours of the salt spray test.

Block Resistance Test

A coating composition sample was applied onto Q panels (cold rolled steel) by using a 150 μm applicator. The obtained coating film first dried at 23° C. and 50% RH of for 5 min, then dried at 60° C. and RH of 50% for 30 hours, and finally dried at 23° C. and RH of 50% for 1 day. Two sample panels were stacked (the coating film of one panel in contact with the coating film of the other panel) with 1 kilogram (kg) weight on top of them. The sample panels with weight were put into a 35° C. oven for 4 hours. Then, the 1 kg weight was removed and the two stacked panels were separated from each other to evaluate the block resistance. The rating of the block resistance property is defined by the separating force and the area of damaging:

A: separated without any force;

B: separated by a slight force;

C: separated by low force with hands;

D: separated by medium force with hands;

E: separated by huge force with hands;

F: separated by tools.

The number means area of damage:

0: no damage: 1: <10%; 2: 10%-30%; 3: >30%-60%; 4: >60%

A-0 represents the best and F-4 is the worst. The block resistance should be B-1 or better to be acceptable.

Solids Content

Determine solids content of aqueous dispersion samples by weighting 0.7±0.1 g of a sample (wet weight of the sample denoted as "W1"), putting the sample into an aluminum pan (weight of aluminum pan denoted as "W2") in an oven at 150° C. for 25 min, and then cooling to room temperature (20-25° C.), and weighting the aluminum pan with the dried sample with total weight denoted as "W3". "W3−W2" refers to dry or solids weight of the sample. The solids content is calculated by (W3−W2)/W1*100%.

GPC Analysis

GPC analysis was performed generally by Agilent 1200. A sample was dissolved in tetrahydrofuran (THF)/formic acid (FA) (5%) with a concentration of 2 milligrams per millimeter (mg/mL) with shaking for over one hour, stored at room temperature overnight, and then filtered through 0.45 μm polytetrafluoroethylene (PTFE) filter prior to the GPC analysis. The GPC analysis was conducted using the following conditions:

Column: One PLgel GUARD column (10 μm, 50 mm×7.5 mm), Two Mixed B columns (7.5 mm×300 mm) in tandem; column temperature: 40° C.; mobile phase: THF/FA (5%); flow rate: 1.0 mL/minute; Injection volume: 100 μL; detector: Agilent Refractive Index detector, 40° C.; and calibration curve: PL Polystyrene narrow standards with molecular weights ranging from 2329000 to 580 g/mol, using polynom 3 fitness.

Synthesis of Polymer Dispersion 1 (PD-1)

Deionized (DI) water (396.8 g), HITENOL™ AR-1025 surfactant (anionic polymerizable surfactant available from DKS Co., Ltd.) (25%, 28.7 g), styrene (ST) available from Langyuan Chemical Co., Ltd. (511.5 g), 2-ethylhexyl acrylate (2-EHA) available from The Dow Chemical Company (436.8 g), cyclohexyl methacrylate (CHMA) available from BASF (299.5 g), methacrylic acid (MAA, 37.7 g), phosphoethyl methacrylate (PEM) available from Solvay (28.5 g), N-(2-Methacry loyloxyethyl) ethylene urea (MEUR) available from Evonik (50%, 18.4 g), and n-Dodecyl mercaptan (n-DDM) (2 g) were mixed together to produce a stable monomer emulsion. To DI water (932 g) under nitrogen atmosphere at 90° C., were added AR-1025 surfactant (25%, 30.5 g), ammonia (25%, 0.8 g) in DI water (10 g), the monomer emulsion (80 g) and ammonium persulfate (APS) (2.5 g) in DI water (15 g) followed by DI water (25 g) to form a reaction mixture. The remaining monomer emulsion, APS (1.5 g) in DI water (90 g) and ammonia (25%, 5.4 g) in DI water (90 g) were then added at 88° C. over 120 min followed by DI water (25 g). At the end of polymerization, $FeSO_4$ (0.019 g) in DI water (5 g) mixed with ethylenediamine tetraacetic acid (EDTA) sodium salt (0.024 g) in DI water (5 g), a solution of t-butyl hydroperoxide (t-BHP, 2.5 g) dissolved in DI water (25 g) and a solution of isoascorbic acid (IAA, 1.1 g) in DI water (25 g), a solution of t-BHP (2.1 g) in DI water (25 g) and a solution of IAA (0.8 g) in DI water (25 g) were added sequentially at 60° C. Then ammonia (24 g) in DI water (24 g) was added at 50° C. to obtain an aqueous dispersion. The obtained aqueous dispersion of PD-1 was characterized according to the test methods below, showing a pH value of 7.66, a Mn of 48,159 g/mol, a solids content of 42.49%, and a particle size of 81 nm. MAA, IAA and n-DDM are all available Sinopharm Chemical Reagent Co., Ltd.

Coating Composition Samples IE 1 and CEs 1-6

Preparation of Acid/Salt Solutions:

Formulations of aqueous solutions of different acids and 2-dimethylaminoethanol (DMEA) are given in Table 2. For each formulation, the specific acid, DMEA and water were mixed, respectively, and stirred to give a transparent solution comprising the specific acid, salts thereof, or mixtures thereof. The acids and DMEA used are all available from Sinopharm Chemical Reagent Co., Ltd.

Preparation of Mills:

Black Mill, $BaSO_4$ Mill, and anticorrosive pigment mills ("$BaSO_4$+ZP-17 Mill" and "$BaSO_4$+PZ-01 Mill") were prepared based on formulations in Tables 3 and 4 by mixing the components using a high-speed disperser at a speed of 800-3,000 revolutions per minute (RPM).

The as prepared aqueous dispersion of PD-1 (as the Binder) and the mills obtained above were used for preparing coating composition samples, according to the black paint formulations given in Table 5. The mills were mixed with the Binder using a conventional lab mixer (mixing speed: 50-1,000 RPM), followed by mixing with the acid/salt solution and other ingredients in the letdown stage. The obtained coating composition samples were evaluated for corrosion resistance according to the test method described under Salt Spray Resistance Test.

TABLE 2

Formulations of acids and DMEA solution

| Component (gram) | Sebacic Acid/Salt Solution | Succinic Acid/Salt Solution | Adipic Acid/Salt Solution | Octanoic Acid/Salt Solution | Oxalic Acid/Salt Solution |
|---|---|---|---|---|---|
| Sebacic acid | 0.5 | | | | |
| Succinic acid | | 0.25 | | | |
| Adipic acid | | | 0.31 | | |
| Octanoic acid | | | | 0.50 | |
| Oxalic acid | | | | | 0.50 |
| Water | 1.5 | 0.70 | 0.88 | 0.84 | 0.84 |
| DMEA | 0.44 | 0.44 | 0.44 | 0.31 | 1.00 |
| Total | 2.44 | 1.39 | 1.63 | 1.65 | 2.34 |

TABLE 3

Formulation of Black Mill

| Component (gram) | |
|---|---|
| Water | 1.60 |
| DISPERBYK 190 | 1.00 |
| BYK-022 | 0.40 |
| PRINTEX POWDER-4 | 1.00 |
| Total | 4.00 |

TABLE 4

Formulations of $BaSO_4$ Mill and Anticorrosive Pigment Mills

| Component (gram) | $BaSO_4$ Mill | $BaSO_4$ + ZP-17 Mill | $BaSO_4$ + PZ-01 Mill |
|---|---|---|---|
| Water | 42.00 | 42.00 | 42.00 |
| TAMOL 731A | 6.00 | 6.00 | 6.00 |
| TWIN 4100 | 1.00 | 1.00 | 1.00 |
| TEGO Airex 901W | 1.00 | 1.00 | 1.00 |
| BENTONE LT | 0.75 | 0.75 | 0.75 |
| ZP-17 | | 60.00 | |
| ZP-01 | | | 80.00 |
| $BaSO_4$ | 200.00 | 118.17 | 80.00 |
| Water | 8.00 | 8.00 | 8.00 |
| Total | 258.75 | 236.92 | 218.75 |

As shown in Table 5, CEs 1-5 coating composition samples didn't contain anticorrosive pigments. As compared to CE 1 containing no Sebacic Acid/Salt Solution, increasing the concentrations of the Sebacic Acid/Salt Solution in CEs 2 and 3 resulted in even worse anti-corrosion properties. It indicates the Sebacic Acid/Salt Solution alone is not useful for improving corrosion resistance in formulations without anticorrosive pigment. CEs 4 and 5 coating composition samples containing anticorrosive pigments alone demonstrated poor corrosion resistance as indicated by a creep much wider than 2 mm. In contrast, after 240-hour salt spray resistance (SSR) testing, IE 1 coating composition sample combining both anticorrosive pigments and Sebacic Acid/Salt Solution demonstrated significantly better corrosion resistance as indicated by a creep along the scribe no more than 2 mm, as compared to CEs 1-5 samples. As compared to CE 6 sample, IE 1 sample comprising less anticorrosive pigment and more sebacic acid surprisingly showed narrower corrosion at scribe line and better corrosion resistance.

TABLE 5

| Black paint formulations | | | | | | | |
|---|---|---|---|---|---|---|---|
| Component (gram) | CE 1 | CE 2 | CE 3 | CE 4 | CE 5 | IE 1 | CE 6 |
| Grind | | | | | | | |
| $BaSO_4$ Mill | 258.75 | 258.75 | 258.75 | | | | |
| $BaSO_4$ + ZP-17 Mill | | | | 236.92 | | 236.92 | |
| $BaSO_4$ + PZ-01 Mill | | | | | 218.75 | | 218.75 |
| Black Mill | 80.00 | 80.00 | 80.00 | 80.00 | 80.00 | 80.00 | 80.00 |
| Sebacic Acid/Salt Solution | | 14.64 | 19.52 | 0.00 | 0.00 | 24.40 | 14.64 |
| Letdown | | | | | | | |
| Binder PD-1 | 679.00 | 679.00 | 679.00 | 679.00 | 679.00 | 679.00 | 679.00 |
| $NaNO_2$ water solution (15%) | 9.10 | 9.10 | 9.10 | 9.10 | 9.10 | 9.10 | 9.10 |
| Texanol | 52.25 | 52.25 | 52.25 | 52.25 | 52.25 | 52.25 | 52.25 |
| ACRYSOL RM-8W | 1.20 | 1.20 | 1.20 | 1.20 | 1.20 | 1.20 | 1.20 |
| Characterization | | | | | | | |
| Wt % Sebacic Acid | 0 | 0.27% | 0.36% | 0 | 0 | 0.46% | 0.28% |
| Wt % Anticorrosive Pigment | 0 | 0 | 0 | 5.67% | 7.69% | 5.54% | 7.58% |
| Sebacic acid/ Anticorrosive Pigment Ratio | / | / | / | / | / | 0.134 | 0.059 |
| Creep at scribe after 240 h SSR (mm) | 10 | 31 | 35 | 8 | 7 | 1.5 | 4.5 |

In tables 5 and 6, "Wt % Sebacic Acid" is calculated by the weight of sebacic acid (originally added) relative to the coating composition weight, where the weight of sebacic acid (originally added) can be calculated by Weight of Sebacic Acid/Salt Solution*0.205. " Wt % Anticorrosive Pigment" is calculated by the weight of anticorrosive pigment relative to the weight of the coating composition. Sebacic acid/Anticorrosive Pigment Ratio is calculated by (Weight of Sebacic Acid/Salt Solution*0.205)/Weight of anticorrosive pigment.

Coating Composition Samples IEs 2-11 and CEs 7-9

Water (1), TAMOL 731A, TWIN 4100, TEGO Airex 901W and BENTONE LT in Table 6 were added sequentially and mixed using a high-speed disperser at a speed of 200-1,000 RPM to form a homogenous blend. Then PZ-01 or ZP-17, and $BaSO_4$ were added and mixed at a speed of 2,000-3,000 RPM. After 10 min, the dispersing speed was adjusted to 300-1,000 RPM and water (2) was added to form a grind. The obtained grinds and the Black Mill prepared above were mixed with the binder using a conventional lab mixer (mixing speed: 50-1,000 RPM), followed by mixing with a specific acid/salt solution and other ingredients in the letdown stage.

As shown in Table 6, the coating composition sample containing 2.49 wt % of the anticorrosive pigment (CE 7) showed poor anticorrosive properties. CE 8 coating composition sample containing the Sebacic Acid/Salt Solution at a concentration of 0.73% failed to meet the creep requirement (i.e. ≤2 mm). CE 9 coating composition sample containing the Oxalic Acid/Salt Solution provided poor anticorrosive properties as indicated by a creep along the scribe of more than 2 mm. In contrast, IEs 2-11 coating composition samples all provided good corrosion resistance as indicated by creeps along the scribe less than 2 mm, even in the absence of aqueous $NaNO_2$ solution, after salt spray resistance (SSR) testing for 240 hours. Also note that IE 4 sample showed better block resistance than IE 11 sample. It indicates that coatings comprising dicarboxylic acids have better block resistance than coatings comprising mono-carboxylic acid.

TABLE 6

| Coating composition samples and characterization | | | | | | | |
|---|---|---|---|---|---|---|---|
| Component (gram) | CE 7 | IE 2 | IE 3 | IE 4 | IE 5 | IE 6 | IE 7 |
| Grind | | | | | | | |
| Water (1) | 42 | 42 | 42 | 42 | 42 | 42 | 42 |
| TAMOL 731A | 6 | 6 | 6 | 6 | 6 | 6 | 6 |
| TWIN 4100 | 1 | 1 | 1 | 1 | 1 | 1 | 1 |
| TEGO Airex 901W | 1 | 1 | 1 | 1 | 1 | 1 | 1 |
| BENTONE LT | 0.75 | 0.75 | 0.75 | 0.75 | 0.75 | 0.75 | 0.75 |
| PZ-01 | | | | 80 | 80 | 80 | |
| ZP-17 | 27.5 | 44 | 55 | | | | 60 |
| $BaSO_4$ | 172.34 | 144.84 | 126.50 | 80 | 80 | 80 | 118.17 |
| Water (2) | 8 | 8 | 8 | 8 | 8 | 8 | 8 |
| Black Mill | 80 | 80 | 80 | 80 | 80 | 80 | 80 |
| Letdown | | | | | | | |
| Binder PD-1 | 679 | 679 | 679 | 679 | 679 | 679 | 679 |
| Sebacic Acid/ Salt Solution | 24.4 | 24.4 | 24.4 | 15.58 | 18.2 | 18.2 | 25.97 |
| Succinic Acid/ | | | | | | | |

TABLE 6-continued

Coating composition samples and characterization

| | | | | | | | |
|---|---|---|---|---|---|---|---|
| Salt Solution | | | | | | | |
| Adipic Acid/ Salt Solution | | | | | | | |
| Octanoic Acid/ Salt Solution | | | | | | | |
| Oxalic Acid/ Salt Solution | | | | | | | |
| Aqueous $NaNO_2$ solution (15%) | 9.1 | 9.1 | 9.1 | 9.1 | 0 | 9.1 | 9.1 |
| Texanol | 52.25 | 52.25 | 52.25 | 52.25 | 52.25 | 52.25 | 52.25 |
| ACRYSOLT ™ RM-8W | 1.2 | 1.2 | 1.2 | 1.2 | 1.2 | 1.2 | 1.2 |
| Characterization | | | | | | | |
| Wt % Sebacic Acid | 0.45% | 0.46% | 0.46% | 0.30% | 0.36% | 0.35% | 0.49% |
| Wt % Anticorrosive Pigment | 2.49% | 4.03% | 5.06% | 7.59% | 7.63% | 7.57% | 5.54% |
| Sebacic Acid/ Anticorrosive Pigment Ratio | 0.18 | 0.11 | 0.09 | 0.04 | 0.05 | 0.05 | 0.09 |
| Creep at scribe after 240 h SSR (mm) | 2.6 | 1.7 | 1.9 | 1.8 | 1.7 | 1.7 | 1.8 |
| Block resistance | | | | B1 | | | |

| Component (gram) | IE 8 | CE 8 | IE 9 | IE 10 | IE 11 | CE 9 |
|---|---|---|---|---|---|---|
| Grind | | | | | | |
| Water (1) | 42 | 42 | 42 | 42 | 42 | 42 |
| TAMOL 731A | 6 | 6 | 6 | 6 | 6 | 6 |
| TWIN 4100 | 1 | 1 | 1 | 1 | 1 | 1 |
| TEGO Airex 901W | 1 | 1 | 1 | 1 | 1 | 1 |
| BENTONE LT | 0.75 | 0.75 | 0.75 | 0.75 | 0.75 | 0.75 |
| PZ-01 | | | | | | |
| ZP-17 | 60 | 60 | 55 | 55 | 55 | 55 |
| $BaSO_4$ | 118.17 | 118.17 | 126.50 | 126.50 | 126.50 | 126.50 |
| Water (2) | 8 | 8 | 8 | 8 | 8 | 8 |
| Black Mill | 80 | 80 | 80 | 80 | 80 | 80 |
| Letdown | | | | | | |
| Binder PD-1 | 679 | 679 | 679 | 679 | 679 | 679 |
| Sebacic Acid/ Salt Solution | 31.17 | 38.96 | | | | |
| Succinic Acid/ Salt Solution | | | 17.8 | | | |
| Adipic Acid/ Salt Solution | | | | 19.4 | | |
| Octanoic Acid/ Salt Solution | | | | | 13.7 | |
| Oxalic Acid/ Salt Solution | | | | | | 6.02 |
| Aqueous $NaNO_2$ solution (15%) | 9.1 | 9.1 | 9.1 | 9.1 | 9.1 | 9.1 |
| Texanol | 52.25 | 52.25 | 52.25 | 52.25 | 52.25 | 52.25 |
| ACRYSOLT ™ RM-8W | 1.2 | 1.2 | 1.2 | 1.2 | 1.2 | 1.2 |
| Characterization | | | | | | |
| Wt % Sebacic Acid | 0.59% | 0.73% | 0.30% | 0.34% | 0.38% | |
| Wt % Anticorrosive Pigment | 5.51% | 5.47% | 5.10% | 5.09% | 5.11% | 5.15% |
| Sebacic Acid/ Anticorrosive Pigment Ratio | 0.11 | 0.13 | 0.06 | 0.07 | 0.07 | |
| Creep at scribe after 240 h SSR (mm) | 1.8 | 2.6 | 1.8 | 2.0 | 2.0 | 3.5 |
| Block resistance | | | | | B2 | |

The invention claimed is:

1. An aqueous coating composition comprising:

(A) an emulsion polymer comprising, based on the weight of the emulsion polymer, from 5% to 28% by weight of structural units of a cycloalkyl (meth)acrylate, from 0.05% to 10% by weight of structural units of a phosphorous acid monomer, a salt thereof, or mixtures thereof, from zero to 10% by weight of an additional ethylenically unsaturated acid monomer, a salt thereof, or mixture thereof, and structural units of an additional monoethylenically unsaturated nonionic monomer;

(B) an aliphatic carboxylic acid, a salt thereof, or mixtures thereof; wherein the aliphatic carboxylic acid has the structure selected from of formula (I), (II), or combinations thereof:

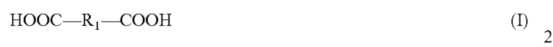

$HOOC—R_1—COOH$ (I)

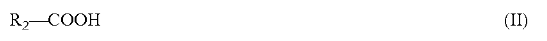

$R_2—COOH$ (II)

where $R_1$ is an alkylene group containing 2 to 16 carbon atoms or a cycloalkylene group containing more than 8 carbon atoms to 16 carbon atoms, and $R_2$ is an alkylene group containing 3 to 17 carbon atoms or a cycloalkylene group containing more than 8 carbon atoms to 17 carbon atoms;

wherein the aliphatic carboxylic acid, the salt thereof, or mixtures thereof are present in an amount to provide $—OOC—R_1—COO—$ and/or $R_2—COO—$ segments at a concentration of greater than 0.29% to less than 0.7% by weight, based on the weight of the aqueous coating composition;

(C) from 2.6% to 10% by weight of an anticorrosive pigment, based on the weight of the aqueous coating composition; and (D) water.

2. The aqueous coating composition of claim 1, wherein the aliphatic carboxylic acid is selected from sebacic acid, dodecanedioic acid, suberic acid, anchoic acid, undecanedioic acid, stearic acid, adipic acid, succinic acid, octanoic acid, decanoic acid, nonanoic acid, or mixtures thereof.

3. The aqueous coating composition of claim 1, wherein the salt of the aliphatic carboxylic acid is an ammonium salt, an alkali metal salt, an amine salt, or mixtures thereof.

4. The aqueous coating composition of claim 1, wherein the weight ratio of the $—OOC—R_1—COO—$ and/or $R_2—COO—$ segments to the anticorrosive pigment is 0.17 or less.

5. The aqueous coating composition of claim 1, wherein the anticorrosive pigment is selected from zinc phosphate, zinc molybdate, zinc oxide, aluminum tripolyphosphate, zinc phosphate molybdenum, calcium-modified zinc phosphate, calcium-ion-exchanged amorphous silica, or mixtures thereof.

6. The aqueous coating composition of claim 1, comprising from 2.8% to 5.7% by weight of the anticorrosive pigment, based on the weight of the aqueous coating composition.

7. The aqueous coating composition of claim 1, further comprising carbon black.

8. The aqueous coating composition of claim 7, comprising from 0.05% to 10% by weight of carbon black, based on the weight of the aqueous coating composition.

9. The aqueous coating composition of claim 1, wherein the cycloalkyl (meth)acrylate is selected from cyclohexyl methacrylate, cyclohexyl acrylate, methcyclohexyl acrylate, or mixtures thereof.

10. The aqueous coating composition of claim 1, wherein the phosphorous acid monomer and/or salt thereof is selected from phosphoethyl methacrylate, phosphoethyl acrylate, allyl ether phosphate, or mixtures thereof.

11. The aqueous coating composition of claim 1, wherein the total concentration of the $—OOC—R_1—COO—$ and/or $R_2—COO—$ segments and the anticorrosive pigment can be in a range of from 5% to 25%, by weight based on the dry weight of the aqueous coating composition.

12. The aqueous coating composition of claim 1, comprising from zero to 2% by weight of a flash rust inhibitor, based on the dry weight of the aqueous coating composition.

13. A method of preparing the aqueous coating composition of claim 1, comprising admixing the emulsion polymer; the aliphatic carboxylic acid, the salt thereof, or mixtures thereof; and the anticorrosive pigment wherein the emulsion polymer is in an aqueous solution, the aliphatic carboxylic acid and/or salt thereof is first dissolved in water prior to the admixing, and/or water is also admixed.

* * * * *